May 17, 1966     W. W. ROBSON, JR     3,251,453
SCREW CONVEYOR WITH SHIELD MEANS

Filed Sept. 26, 1962     2 Sheets-Sheet 1

INVENTOR.
WILLIAM W. ROBSON JR.
BY
ATT'Y.

May 17, 1966 W. W. ROBSON, JR 3,251,453
SCREW CONVEYOR WITH SHIELD MEANS
Filed Sept. 26, 1962 2 Sheets-Sheet 2
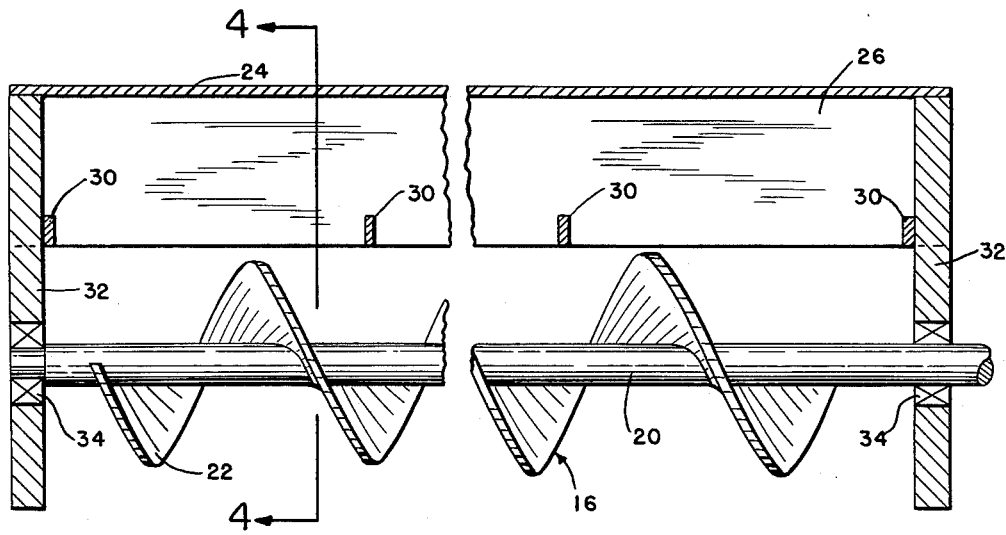
FIG. 3
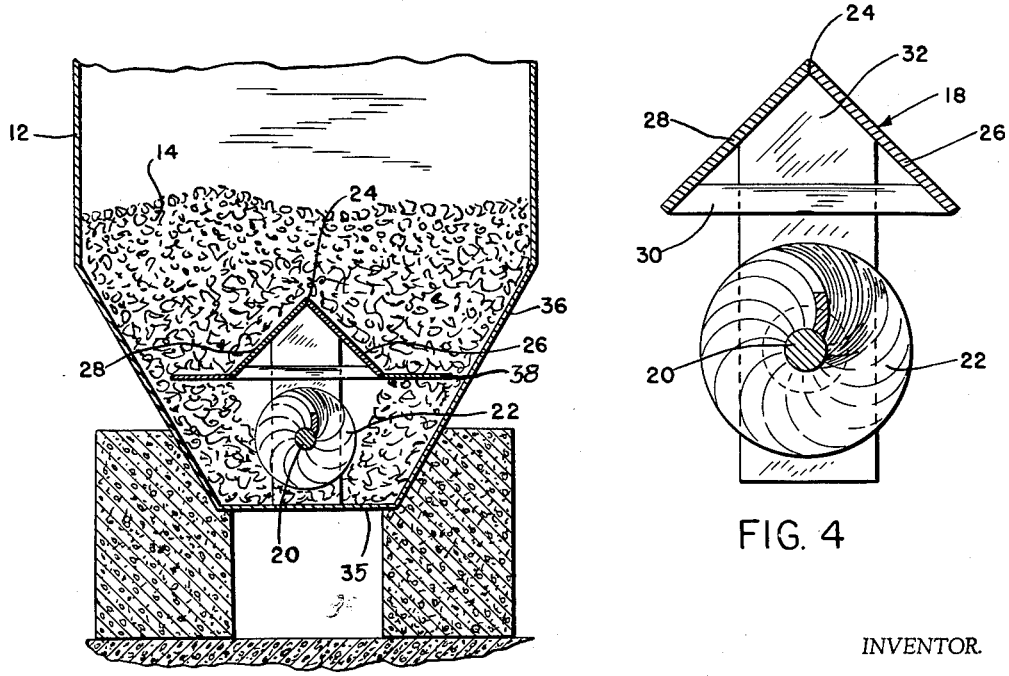
FIG. 2
FIG. 4
INVENTOR.
WILLIAM W. ROBSON JR.
BY
ATT'Y.

they the screw has the screw of the particles has been

United States Patent Office 3,251,453
Patented May 17, 1966

3,251,453
SCREW CONVEYOR WITH SHIELD MEANS
William W. Robson, Jr., 1621 Highland, Wilmette, Ill.
Filed Sept. 26, 1962, Ser. No. 226,316
6 Claims. (Cl. 198—64)

This invention relates in general to conveyors and in particular to a screw conveyor for transferring large quantities of material of substantially large particle size such as coal, stone, etc.

Heretofore, the screw of the conveyor has generally been disposed within a cylindrical tube opened at the far end to permit the particles to enter and be carried lengthwise along the tube by the action of the screw. In this type of arrangement it is necessary to have a minimum of clearance between the screw and the tube for proper lateral movement of the particles. Frequently foreign particles, such as a bolt or metal piece, inadvertently mixed with the material to be transferred, becomes lodged between the screw and the conveyor causing the arrangement to jam. To repair such a stoppage or breakdown, it is necessary to completely remove all of the material within the receptacle or hopper to gain access to the conveyor tube.

A further disadvantage created from having the screw in close operating relationship with the tube is that any deflection of the tube due to the weight of the material thereon will cause the screw to come into frictional surface to surface contact with the tube thus creating a binding effect and undue wear.

Several devices of this nature have been developed in an attempt to provide a smooth operating particle transfer arrangement which is substantially continuous in operation and maintenance free. Such prior art devices have provided rather complicated and bulky structural arrangement which require not only conisderable cost and additional maintenance, but require considerable space for mounting and operation.

It is therefore the primary object of this invention to provide an improved screw conveyor which eliminates the shortcomings and disadvantages of prior devices of this nature.

A specific object of this invention is to provide an improved screw conveyor protected from the compacted particles and the weight of the particles within the hopper above the screw yet permitting the screw to be in open contact with the particles over its entire length.

A further object of this invention is to provide an improved screw conveyor for transferring large particles a substantial distance with the screw journalled in spaced apart relationship from a particle deflecting shield thus eliminating the possibility of stoppage or breakage in the presence of large foreign metallic parts.

Another object of this invention is to provide an improved screw conveyor that is simple in design, economical to manufacture, easy to service, compact in size and readily mounted in existing storage receptacles or hoppers and provides a smooth continuous and exceptionally quiet transfer of the large particles of the material with an accelerated delivery at its delivery end which eliminates pile up stoppages.

A still further object of this invention is to provide an improved screw conveyor for transferring large particles, such as coal, which is light in weight and portable for use on material transport vehicles to assist the unloading of the vehicles at the point of delivery.

Further objects and advantages will appear from the following description and claims in connection with the accompanying drawings which illustrate, by way of example and not by limitation, a single embodiment of the invention, but it is to be understood that various changes and alterations of the structure may be made without departing from the scope of the invention as set forth in the appended claims.

FIG. 2 is a framentary partially sectioned and elevational view taken along the line 2—2 of FIG. 1;

FIG. 3 is a fragmentary partially sectioned enlarged side elevational view of the screw conveyor of this invention; and FIG. 4 is a sectional view taken along the lines 4—4 of FIG. 3.

Figure 1:
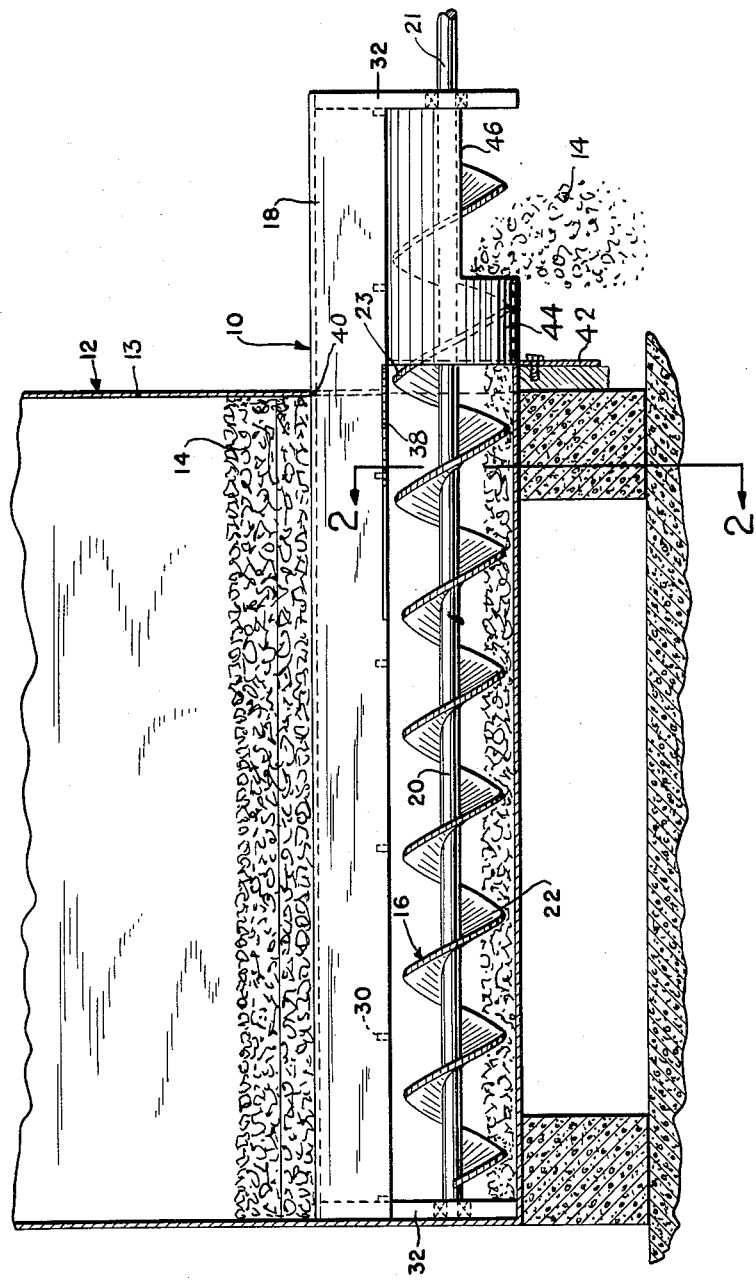
FIG. 1 is a fragmentary partially sectioned side elevational view illustrating the relationship of the screw conveyor of this invention mounted within a receptacle or hopper.

Referring now to the drawings, more specifically to FIG. 1, the screw conveyor of this invention, indicated generally by the numeral 10, is shown in a preferred operating position within a receptacle or hopper 12. The hopper 12 is illustrated as being partially filled with a substantially large particle material 14, such as coal.

The screw conveyor 10 consists primarily of two main sections; a screw 16 and an inverted V-shaped particle deflecting shield 18 along and above the screw. The screw 16 can be of conventional configuration and preferably has a long shaft 20 having sufficient strength to resist deflection under its own weight over substantially its length. Metallic blades 22 are helically secured thereto which have an increased diameter over the last two or three turns 23 at the outlet end thereof. The screw 16 may be rotated by any suitable conventional means, such as a chain and sprocket or worm gear arrangement (not shown) secured to the projecting shaft element 21. The screw seldom if ever has to be removed.

Referirng now more particularly to FIGS. 3 and 4, the particle deflecting shield is of triangular configuration with the apex 24 of the triangle extending upwardly directly over the center of the screw 16. The triangular configuration of the shield 18 preferably defines a right isosceles triangle with the hyoptenuse dimension appreciably greater than the diameter of the screw blades 22 and the legs 26 and 28 providing an outward slope supporting the weight of the particles 14 in the hopper above it off of the screw and deflecting the particles outwardly on both sides of the screw only far enough to yet permit them to slide or flow at an angle into only the bottom portions of the screw as they move downwardly throughout the length of the screw. The marginal edge of the legs 26 and 28 extend outwardly past the periphery of the screw a far enough distance to prevent the particles from resting in or against the upper portion of the screw.

As readily seen in FIGS. 1 and 3 the legs 26 and 28 extend the full length of the screw and are preferably formed from a solid rigid metallic plate material. To increase the beam-like rigidity of the shield 18, reinforcing cross members 30 are securely positioned at spaced intervals within the shield, preferably adjacent the lowermost edge of legs 26 and 28.

A screw support arm 32 is bolted at each end of the shield 18 and journals the ends of the shaft 20 of the screw 16 in bearings 34 secured in each of the arms 32. The screw 16 is positioned as shown a substantial distance below the lowermost portion of the shield to eliminate possible contact, binding or interference between the two cooperating parts in the presence of foreign particles when the conveyor is subjected to the heaviest of loads and the hopper is completely filled with material. The shield carries the weight of the coal, the screw has only its own weight to support at all times, has a constant work load fed to its lowermost portion, yet can deflect enough to handle all particles within the hopper without binding.

Referring now briefly to FIGS. 1 and 2, the screw conveyor 10 is preferably mounted adjacent to but spaced a few inches above the bottom 34 of the hopper 12. The hopper 12 also preferably provides side walls 36 having a lower inwardly tapered portion to direct the downward movement of the particles inwardly thus permitting total exhaustion of the hopper. The hopper may be any size and the screw any length.

At its outer end the screw extends under an element 38 which preferably defines a semi-circular secondary shield above the screw that is wider than the shield 18 at the outlet opening 40 in wall 13 of the hopper. This outlet opening is wider than the screw diameter so that rod-like tools (not shown) may be projected through the opening below the shield 38 to dislodge anything in the screw blades at the opening. The opening is closed down to the size of the screw by a removable cover secured against the outer face of the hopper wall and beyond the cover 42 the screw enters a tube 44 having a discharge or drop out opening 46 for the coal. Whenever the cover 42 is removed, the shield 38 prevents any coal above it running out through 46. Only the coal within the screw turn at the opening runs out.

The screw turns 23 of increased diameter extend approximately one turn into the hopper inside the opening 40 and thereby assure coal being taken into the tube 44 at a rate sufficiently greater that there will be no pile up of coal in the screw at this point. Below the opening 46 the coal can be further handled any way desired including by belt or vacuum conveyor.

Thus, it is readily understood that as the screw conveyor of this invention is actuated, the particles disposed on the bottom of the hopper and adjacent the screw along its entire length are in engagement with the screw and as kept there by adjacent particles they are moved towards the end of the screw outside the hopper free of any crushing or grinding that would be induced if the screws and particles therein were subjected to the weight of the coal in the hopper.

As noted the triangular particle deflecting shield 18 carries the weight of the material above the screw and feeds the downwardly moving particles outwardly away from the screw only as needed to replace the particles which are being transversely propelled. Thus, the combined outward movement of the particles created by the shield and the inward movement of the particles by the tapered sides of the hopper permits feeding of the particles to the entire length of the screw from the side with the upper portion of the screw directly below the shield completely free from any particles and weight.

The screw being journalled at each extremity is free to rotate continuously without contact with any additional parts of the conveyor and therefore there will be a minimum of wear on the screw and the only noise to be heard is the soft sound of freely moving particles rustling against one another.

Preferably the location of the parts is such that with the apex and sides of the shield 18 defining in part three points of a square, the axis of the screw is at or slightly within the fourth point thereby permitting coal to slide at an angle of 45° or less into the lowermost area of the screw.

While but one embodiment of the invention has been shown and described in detail, it will be understood that various changes and alterations may be made therein without departing from the principle or scope thereof as set forth in the appended claims.

What is claimed is:

1. A conveyor for transferring particles of material from a receptacle comprising:
   a screw including a shaft having a helical blade continuous throughout the major portion of its intermediate length,
   means for journalling the screw for rotation in a position spaced above the bottom of the receptacle, and
   shield means wider than the screw with its edges supported above said bottom a distance approximately equal to the diameter of the helical blade,
   said screw being open laterally to the receptacle for its full height above said bottom and below said edges.

2. The combination called for in claim 1 in which said shield means defines an isosceles triangle confiuration with the apex of the equal sides thereof providing downwardly diverging slopes and the axis of said screw defining with said isosceles triangle a square with the helical blade in contact below its axis with the particles to be fed.

3. A conveyor for transferring particles of material from a receptacle comprising:
   a screw journalled in said receptacle including a shaft having a helical blade secured thereto the bottom of which is spaced several inches above the portion of the bottom of the receptacle that is laterally adjacent thereto,
   an inverted V-shaped angular shield supporting the weigth of the particles above it in the receptacle and with its lower marginal edges extending horizontal beyond the periphery of said blade and disposed at a level equal approximately to the top of said helical blade,
   conduit means terminating under said shield and encompassing the delivery end of the screw and having an opening therein.

4. A conveyor for transferring particles of material from a hopper comprising:
   a screw including a shaft having a helical blade thereon whose lower edge is disposed above that portion of the bottom of the hopper that is horizontally adjacent thereto, said blade being in contact with particles of material in the hopper that are below it to transport them through an opening in a wall of the receptacle to a point outside the receptacle,
   support members journalling said screw,
   shield means wider than the diameter of said helical blade supported close above the screw a distance above the bottom of the receptacle substantially equal to the diameter of the helical blade to free the screw from the weight of particles in said receptacle,
   said shield means extending to said opening,
   conduit means outside of said receptacle around said screw and having an opening at the delivery end of the screw,
   said blade having a larger diameter within said conduit means.

5. A conveyor for transferring coal from a hopper having a floor, said conveyor comprising:
   a conveyor screw including a shaft having a helical blade thereon continuous throughout the major portion of its intermediate length,
   means journalling the screw for rotation within the confines of the coal in said hopper with the lowest point of the helical blade disposed a spaced distance of several inches above the level of the floor that is laterally adjacent thereto,
   means for supporting the weight of the coal above said screw including an inverted V-shaped angular shield whose apex and marginal edges along with the axis of the screw define a square with said marginal edges extending horizontally beyond the periphery of said helical blade to prevent coal from sliding against the upper portion of the screw but with the screw open horizontally its full height to the hopper above the floor for the coal to flow readily past said edges into the lower portion of the helical blade while it is turning.

6. A conveyor for transferring particles of material from a hopper comprising:
   a screw including a shaft having a helical blade thereon whose lower edge is disposed above that portion of the bottom of the hopper that is horizontally adjacent thereto, said blade being in contact with particles of material in the hopper that are below it to transport them through an opening in a wall of the receptacle to a point outside the receptacle, support members journalling said screw, shield means wider than the diameter of said helical blade supported close above the screw a distance above the bottom of the receptacle substantially equal to the diameter of the helical blade to free the screw from the weight of particles in said receptacle, said shield means extending to said opening, a secondary shield wider than said shield means disposed above said opening to prevent particles running out of the opening past said blade, service closure means for closing said opening, and conduit means outside of said receptacle around said screw and having an opening at the delivery end of the screw, said blade having a larger diameter within said conduit means.

References Cited by the Examiner
UNITED STATES PATENTS

| | | | |
|---|---|---|---|
| 2,531,928 | 11/1950 | Webb | 198—64 |
| 2,991,870 | 7/1961 | Griffith et al. | 198—64 |
| 3,021,025 | 2/1962 | Sudenga et al. | 198—64 X |
| 3,045,804 | 7/1962 | Peterson | 198—64 |

SAMUEL F. COLEMAN, *Primary Examiner.*

WILLIAM B. LABORDE, ROBERT B. REEVES,
*Examiners.*